United States Patent [19]
Habel et al.

[11] Patent Number: 5,616,259
[45] Date of Patent: Apr. 1, 1997

[54] APPARATUS FOR PREPARING A SURFACE OF A CYLINDER BORE BY ELECTRICAL DISCHARGE MACHINING

[75] Inventors: Michael J. Habel, Ann Arbor; Larry A. Peterson, Grosse Ile, both of Mich.

[73] Assignee: Ford Motor Company, Dearborn, Mich.

[21] Appl. No.: 364,151

[22] Filed: Dec. 27, 1994

[51] Int. Cl.$^6$ .............................. B23H 1/00; B23H 9/00
[52] U.S. Cl. ................................................. 219/69.2
[58] Field of Search ........................ 219/69.2, 69.1, 219/69.11, 69.17, 69.14, 68

[56] References Cited

U.S. PATENT DOCUMENTS

| | | | |
|---|---|---|---|
| 2,263,412 | 11/1941 | Armentrout | 219/69.17 |
| 2,942,092 | 6/1960 | Cammann | 219/69.2 |
| 4,162,383 | 7/1979 | Hamasaki | 219/68 |
| 4,409,458 | 10/1983 | Inoue | 219/69.14 |
| 4,476,369 | 10/1984 | Inoue | 219/69.17 |
| 4,706,417 | 11/1987 | Gary . | |
| 4,743,729 | 5/1988 | Beal | 219/69.12 |
| 4,804,814 | 2/1989 | Southerland et al. | 219/69.2 |
| 4,916,282 | 4/1990 | Chammings et al. | 219/69.2 |
| 4,948,933 | 8/1990 | Thompson | 219/69.2 |
| 5,036,173 | 7/1991 | Wilson et al. | 219/69.11 |
| 5,085,014 | 2/1992 | Sandhof . | |
| 5,086,201 | 2/1992 | Grypczynski et al. | 219/69.17 |
| 5,225,645 | 7/1993 | Overbay et al. | 219/69.11 |
| 5,268,550 | 12/1993 | Blocquel et al. | 219/69.17 |
| 5,317,607 | 5/1994 | Formanek | 219/69.2 |
| 5,543,599 | 8/1996 | Cole et al. | 219/69.2 |

*Primary Examiner*—Geoffrey S. Evans
*Attorney, Agent, or Firm*—Joseph W. Malleck, Esq.; Roger L. May, Esq.

[57] ABSTRACT

An apparatus for preparing a surface of a cylinder bore by electrical discharge machining includes a rotatable spindle and at least one electrode operatively connected to a power source and rotatably supported upon the spindle, the electrode being movable radially relative to the surface of the cylinder bore between a first retracted position such that the electrode is positioned within the cylinder bore prior to preparing the surface and at a second position spaced from the first position wherein the electrode is adjacent the surface of the cylinder bore for preparing the surface by electrical discharge machining as the electrode rotates with the spindle.

12 Claims, 2 Drawing Sheets

APPARATUS FOR PREPARING A SURFACE OF A CYLINDER BORE BY ELECTRICAL DISCHARGE MACHINING

BACKGROUND OF THE INVENTION

1. Field of the Invention

The present invention relates generally to electrical discharge machining and, more specifically, to a method and apparatus for preparing a surface of a cylinder bore, such as in an engine, brake caliper or other component, by electrical discharge machining.

2. Description of the Related Art

It is known to employ a plurality of pistons which reciprocate within cylinder bores of an engine under forces created by combustion of an air and fuel mixture therein. It is also known that the pistons, piston rings and cylinder bores wear relative to each other during this reciprocation. As a result, cast iron wear sleeves or inserts have been employed within the cylinder bores between the pistons, piston rings and a surface of the cylinder bores to improve the wear characteristics at this juncture.

Although the above cast iron wear sleeves have worked well, they suffer from the disadvantage that cast iron is relatively heavy, and therefore adds weight and cost to the engine. In order to eliminate these disadvantages in automotive engines, thermal spray or wear coatings have been developed to take the place of the cast iron wear sleeves while retaining the wear characteristics of the piston/cylinder bore arrangement.

Typically, the surface of the cylinder bore of an automotive engine is very smooth and must be prepared or toughened in order that the thermal wear coating can adhere thereto. A number of methods and apparatuses have been employed to prepare the surface of the cylinder bore. However, all have certain disadvantages.

For example, it is known to prepare the surface of the cylinder bore using conventional machine tools and methods. However, this has been found to suffer from the disadvantage that adequate surface preparation is typically not achieved and it is difficult to position the machine tool relative to the bore.

It is also known to employ grit blasting to produce many fine pock marks or minutely roughen the surface of the cylinder bore. Unfortunately, grit blasting suffers from the disadvantage that it is a relatively messy operation wherein grit, dust and other particles are generated in the work area. Thus, while relatively effective as a surface preparation, grit blasting has resulted in other, less desirable, disadvantages which overall reduces the effectiveness of grit blasting as a method for preparing the surface of cylinder bore for a thermal wear coating.

It is further known to employ water or $H_2O$ blasting similar to grit blasting but wherein water is employed at very high pressure to prepare the surface of the cylinder bore. However, water blasting suffers from the disadvantage that it requires very expensive equipment operating at very high pressures such that it is not cost competitive. Further, the water may introduce a corrosion factor into the equation further limiting the application of water blasting for this purpose.

SUMMARY OF THE INVENTION

Accordingly, the present invention is an apparatus for preparing a cylinder bore by electrical discharge machining including a power source, a rotatable spindle and at least one electrode operatively connected to the power source and rotatably supported on the spindle. The electrode is moveable radially relative to a surface of the cylinder bore between a first retracted position such that the electrode is positioned within the cylinder bore prior to preparing the surface and a second position which is spaced from the first position wherein the electrode is adjacent the surface of the cylinder bore for preparing the surface by electrical discharge machining as the electrode rotates with the spindle.

Additionally, the present invention is a method preparing a cylinder bore by electrical discharge machining including the steps of locating at least one electrode within the cylinder bore when the electrode is disposed in a first retracted position and moving the electrode to a second position spaced from the first position wherein the electrode is adjacent the surface of the cylinder bore. The method also includes the steps of rotating the electrode relative to the surface of the cylinder bore and applying electrical power to the electrode to remove material from the surface of the cylinder bore as the electrode rotates relative thereto.

One advantage of the present invention is that a method and apparatus are provided for preparing a surface of a cylinder bore, such as in an engine, brake caliper or other component, by electrical discharge machining. Another advantage of the present invention is that the method and apparatus allow high volume surface preparation of cylinder bores in anticipation of thermal wear coating applications in relatively short cycle times. Yet another advantage of the present invention is that the method and apparatus are relatively inexpensive in that they do not require expensive tooling or locating apparatuses, do not require dielectric oil baths and there is no residual mess or dispersion of particles as with grit blasting.

Other features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
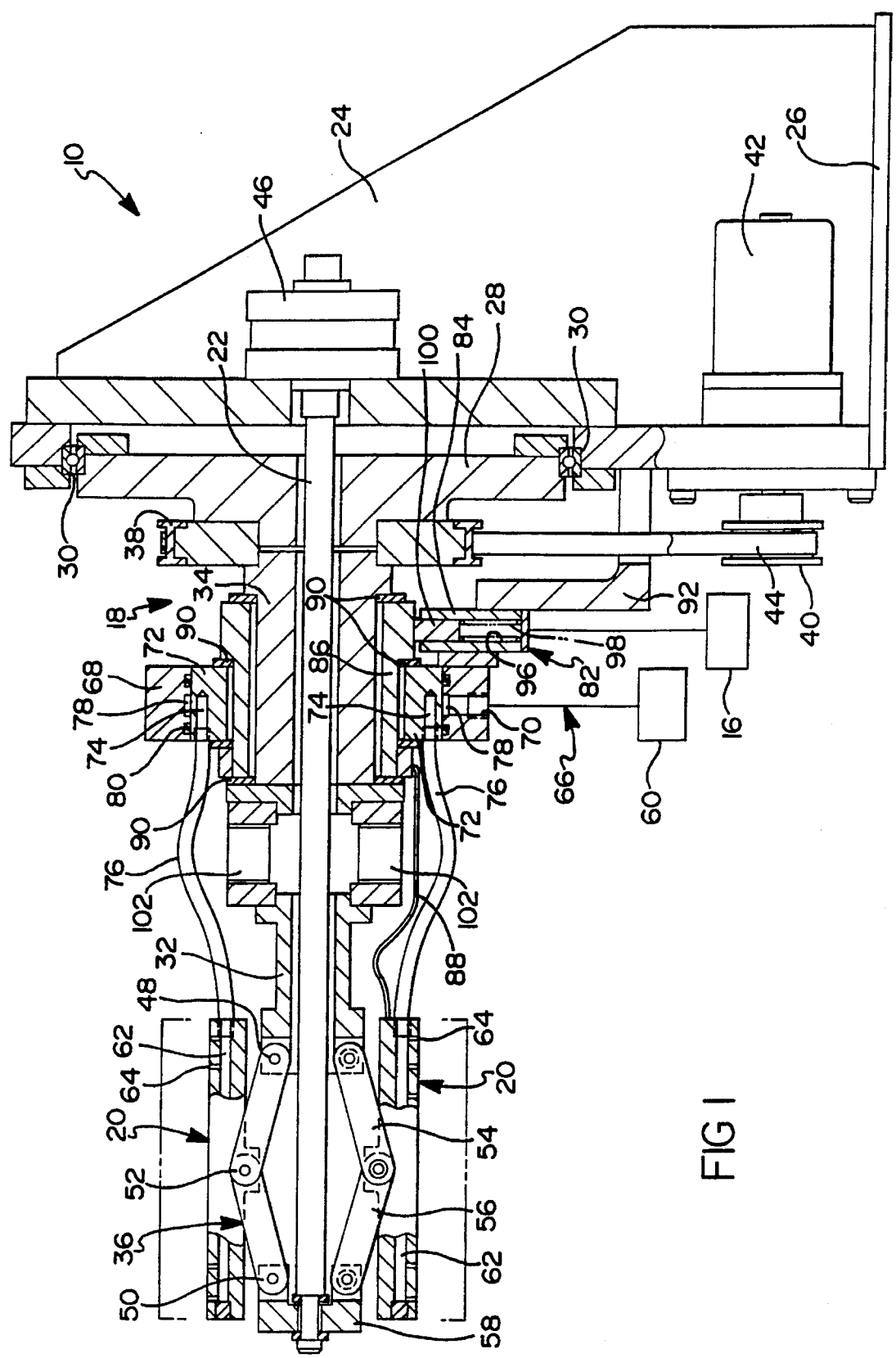
FIG. 1 is sectional view of an apparatus, according to the present invention, for preparing a surface of a cylinder bore in an engine by electrical discharge machining.
Figure 3:
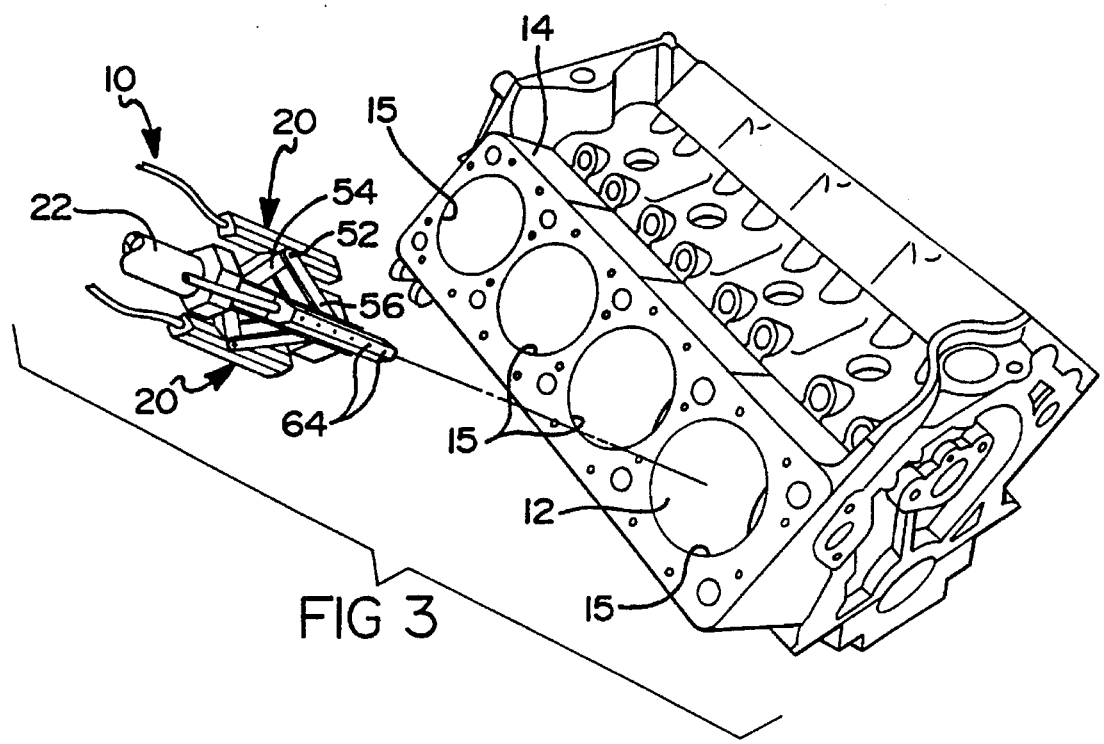
FIG. 3 is a partial perspective view illustrating a portion of the apparatus of FIG. 1 in operational relationship to a cylinder bore of an engine.

Referring now to the drawings, and more particularly to FIGS. 1 and 3, one embodiment of an apparatus 10, according to the present invention, is shown for preparing a surface of a cylinder bore 12 such as in an engine 14 of a vehicle such as an automotive vehicle (not shown). The apparatus 10 is used for preparing a surface 15 of the cylinder bore 12 by electrical discharge machining (EDM). The cylinder bore 12 receives a piston (not shown) as commonly known in the art and the surface 15 is prepared by EDM to create small displacements on the surface 15 and thereby roughened to accept a thermal wear coating (not shown) as is known in the art. It should be appreciated that while the engine 14 depicted in FIG. 3 is of a V-8 configuration, the apparatus 10, according to the present invention, can be employed to prepare any number of cylinder bores in engines, brake calipers or other components having a variety of configurations.

Figure 2:
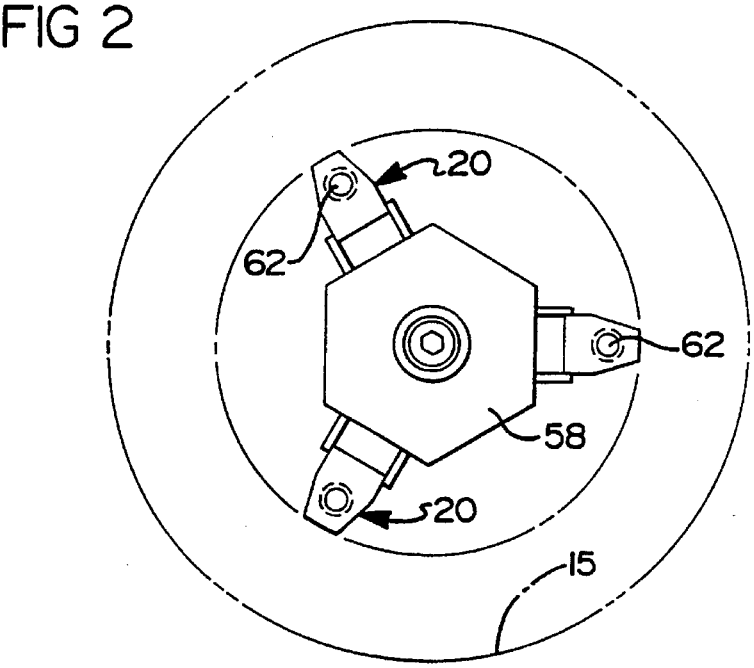
FIG. 2 is an end view of the apparatus of FIG. 1.

The apparatus 10 includes a power source, generally indicated at 16, a rotatable spindle, generally indicated at 18, and at least one, but preferably a plurality of electrodes, generally indicated at 20, radially disposed relative to each other about the spindle 18. The electrodes 20 are operatively connected to the power source 16 and rotatably supported on the spindle 18. As will be discussed in greater detail below, the electrodes 20 are movable radially relative to the surface 15 of the cylinder bore 12 between a first retracted position as shown in FIGS. 1 and 2 such that the electrodes 20 are adapted to be positioned within the cylinder bore 12 prior to preparing the surface 15 and a second position, as shown by phantom lines in FIGS. 1 and 2, spaced from the first position. In the second position, the electrodes 20 are adjacent the surface 15 of the cylinder bore 12 for preparing the surface 15 by EDM as the electrodes 20 rotate with the spindle 18.

The apparatus 10 also includes a centrally disposed shaft 22 rotatably carried by the spindle 18 and is linearly moveable between extended and retracted positions. As shown in FIG. 1, the shaft 22 is in its extended position and is operatively coupled to the electrodes 20 and moves the electrodes 20 between their first and second positions as the shaft 22 moves between its extended and retracted positions.

The apparatus 10 further includes a mounting portion 24 fixed to a support structure 26. The support structure 26 is a structure which locates the apparatus 10 relative to the engine 14 as is shown in the art. The spindle 18 includes a hub 28 and bearings 30 rotatably supporting the hub 28 relative to the mounting portion 24. The spindle 18 further includes a bridge portion 32 and a middle portion 34 extending between the hub 28 and the bridge portion 32. In turn, the bridge portion 32 extends between the middle portion 34 and a linkage mechanism, generally indicated at 36. The linkage mechanism 36 operatively interconnects the electrodes 20 with the spindle 18 and the shaft 22 and supports the electrodes 20 relative to the spindle 18 and the shaft 22 between their first and second portions. The linkage mechanism 36 will be discussed in greater detail below.

The spindle 18 further includes a driven pulley 38 operatively interconnecting and fixedly attached to the hub 28 and the middle portion 34. A drive pulley 40 is operatively connected by a belt 44 to the driven pulley 38 for driving the driven pulley 38 and rotating the spindle 18 on the bearings 30 relative to the mounting portion 24 when engaged. A rotary actuator 42 in the form of an electrical motor is operatively coupled to the drive pulley 40 for driving or rotating the drive pulley 40. The spindle 18 also includes a linear actuator 46 in the form of a pneumatic cylinder fixed to the mounting portion 24 and operatively coupled to the shaft 22 to actuate the shaft 22 linearly between its extended and retracted positions. It should be appreciated that the belt 44 extending between the drive pulley 40 and driven pulley 38 transmits rotational input from the drive pulley 40 to the spindle 18 through the driven pulley 38.

The linkage mechanism 36 which interconnects the electrodes 20 with the spindle 18 and the shaft 22 includes a first end 48 and a second end 50. The first end 48 is pivotally connected to the bridge portion 32 of the spindle 18. The second end 50 is pivotally connected to the shaft 22. The linkage mechanism 36 further includes a center portion 52 disposed between the first end 48 and second end 50 and pivotally coupled to the electrodes 20. The first and second ends 48,50 and the center portion 52 of the linkage mechanism 36 co-act such that the linkage mechanism 36 moves the electrodes 20 between their first and second portions when the shaft 22 is moved between its extended and retracted positions.

In the preferred embodiment, the linkage mechanism 36 includes a pair of link members 54, 56 pivotally coupled together and to the electrodes 20 at the center portion 52. More specifically, one link member 54 is pivotally connected to the bridge portion 32 of the spindle 18 at the first end 48 and the other link member 56 is pivotally connected to the shaft 22 at the second end 50. An end cap 58 is fixed to a distal end of the shaft 22 and interconnects the second end 50 of the link member 56 to the shaft 22.

The electrodes 20 extend in a direction substantially parallel to the longitudinal axis of the shaft 22 and are operatively connected to a source of dielectric fluid 60. The electrodes 20 each include a central passage 62 extending longitudinally therethrough and a plurality of exit ports 64 in fluid communication with the central passage 62. The passages 62, 64 function to present dielectric fluid between the electrodes 20 and the surface 15 of the cylinder bore 12 when the electrodes 20 are in the second position.

The apparatus 10 further includes a fluid coupling, generally indicated at 66, in fluid communication with the source of dielectric fluid 60 and the passages 62, 64 of the electrodes 20. The fluid coupling 66 includes a fixed member 68 having an inlet passage 70 in fluid communication with the source of dielectric fluid 60. The fluid coupling 66 also includes a movable member 72 rotatably carried on the middle portion 34 of the spindle 18. The moveable member 72 has at least one, but preferably a plurality of outlet passages 74 in fluid communication with the inlet passage 70 of the fixed member 68. The inlet passage 70 terminates in an annular groove 78 which extends about the circumference of the rotating moveable member 72. The outlet passages 74 are in fluid communication with the annular groove 78. The outlet passages 74 also correspond to and are in fluid communication with the passages 62, 64 of each of the electrodes 20. To that end, the fluid coupling 66 includes fluid lines 76 extending between, rotating and in fluid communication with a corresponding outlet passage 74 and the passages 62, 64 of each of the electrodes 20. The fluid coupling 66 also includes a sealing member 80 between the rotating moveable member 72 and the fixed member 68.

The apparatus 10 further includes an electrical coupling, generally indicated at 82, operatively interconnected between the power source 16 and the electrodes 20. The electrical coupling 82 includes a fixed connection member 84 electrically connected to the power source 16 and a movable brush member 86 rotatably carried on the middle position 34 of the spindle 18 and in electrical contact with the connection member 84 and the electrodes 20. The electrical coupling 82 also includes a conductive line or wire 88 extending between, rotating and in electrical contact with the movable brush member 86 and each of the electrodes 20. A plurality of isolation blocks 90 are disposed between the movable member 86 and the middle portion 34 of the spindle 18 to electrically isolate the electrical coupling 82 from the middle portion 34 of the spindle 18.

The connection member 84 is fixed to a support member 92 and has a cavity 96 with a spring member 98 in the form of a coiled spring disposed therein. An electrical conductor 100 in the form of a contact is disposed between the spring member 98 and the movable brush member 86 and is urged into electrical contact with the movable brush member 86.

The apparatus 10 further includes a compliance device 102 located between the bridge portion 32 and the middle portion 34 of the spindle 18 for locating the electrodes 20 relative to the cylinder bore 12 to be prepared. If misalignment occurs, the compliance device 102, which is a typical single plane remote center compliant wrist, will allow the electrodes 20 to align with the cylinder bore 12.

Additionally, a method, according to the present invention, is provided for preparing from the surface 15 of a cylinder bore 12. The method includes the steps of locating at least one, but preferably a plurality of the electrodes 20 within the cylinder bore 12 when the electrodes 20 are disposed in the first retracted position. The method includes moving the electrodes 20 to a second position spaced from the first position wherein the electrodes 20 are adjacent to the surface 15 of the cylinder bore 12. The method further includes presenting a dielectric fluid between the electrodes 20 and the surface 15 of the cylinder bore 12. The method further includes rotating the electrodes 20 relative to the surface 15 of the cylinder bore 12 and then applying power from a source of electrical power 16 to begin the EDM process of removing material from the surface 15 of the cylinder bore 12. More specifically, when an electrical charge becomes sufficient, an arc discharges across the gap between the electrodes 20 and the surface 15 and causes a small area on the surface 15 of the cylinder bore 12 to melt and become displaced. It should be appreciated that the discharge occurs many times per second and, eventually, causes the entire surface 15 of the cylinder bore 12 to become pock marked such that it easily accepts the spraying application of a thermal wear coating.

In the preferred embodiment, the dielectric fluid is deionized or nonconductive water. When the electrodes 20 are moved to their second positions they may actually contact the surface 15 of the cylinder bore 12. The dielectric flows through the fluid coupling out a plurality of exit ports 64 in the electrodes 20, for example from several hundred pounds per square inch to several thousand pounds per square inch, to form a hydrostatic bearing between the electrodes 20 and the cylinder bore 12. Under the forces created by this pressure, the electrodes 20 are moved radially back a small distance against the force of the pneumatic cylinder thus producing a gap between the electrodes 20 and the surface 15 of the cylinder bore 12 which is filled by the dielectric fluid. In this instance, the dielectric fluid not only supplies a dielectric value but also holds and defines the gap between the electrodes 20 and the surface 15 of the cylinder bore 12. Upon rotation of the electrodes 20, the dielectric fluid forms a hydrodynamic bearing between the electrodes 20 and the surface 15 of the cylinder bore 12. In addition, the dielectric fluid supplies a flushing medium to sweep away EDM machining swarf and dissipate heat.

Once the surface 15 of the cylinder bore 12 has been properly treated, the power is terminated. Thereafter, the source of dielectric fluid is also terminated. The rotation of electrodes 20 is then stopped, and the electrodes 20 are moved from their second position back to their first retracted position and then removed from the cylinder bore 12.

The apparatus 10 of the present invention includes an electronic controller (not shown) which regulates the pressure of the air in the pneumatic cylinder of the linear actuator 46 as well as that of the dielectric fluid. It will also be appreciated that due to variances in the positioning of the apparatus 10 and the pressures of both the dielectric fluid and the air in the pneumatic cylinder of the linear actuator 46, the gap between the electrodes 20 and the surface 15 of the cylinder bore 12 can vary. The electronic controller compensates for these variances by reading the gap voltage across the dielectric and adjusting the power supply 16 to optimum value. In addition, the speed of the rotation of the electrode 20 is also monitored by electronic controller to prevent over preparation in the same area in the case of slower speeds and insufficient preparation in the case of excessive speeds of rotation. Generally speaking, however, faster rotation results in better EDM machining swarf flush during preparation. On the other hand, if the electrodes 20 are rotated at excessive speeds, they will outrun the flush created by the dielectric fluid resulting in shortages between the electrodes 20 and the surface 15 of the cylinder bore 12 due to the presence of EDM machining swarf and insufficient hydrodynamic barrier.

Accordingly, the apparatus 10 of the present invention allows for preparation of the surface 15 of a cylinder bore 12 in an engine 14 which is fast, efficient, effective, and allows for high volume processing of the cylinder bores 12 in relatively short cycle times.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An apparatus for preparing a surface of a cylinder bore by electrical discharge machining comprising;

a rotatable spindle;

a plurality of electrodes rotatably supported upon said spindle and an electrical coupling operatively interconected between a power source and said electrodes and including a fixed connection member electrically connected to the power source and a moveable connection member rotatably carried on said spindle and in electrical contact with said fixed connection member and each of said electrodes, said electrodes being moveable radially relative to the surface of the cylinder bore between a first retracted position such that said electrodes are positioned within the cylinder bore prior to preparing the surface and a second position spaced from said first position adjacent the surface of the cylinder bore for preparing the surface; and means for rotating said spindle about its longitudinal axis relative to the surface of the cylinder bore and applying electrical power to said electrodes to remove material from the surface of the cylinder bore by electrical discharge machining as said electrodes rotate with said spindle.

2. An apparatus as set forth in claim 1 including a centrally disposed shaft rotatably carried by said spindle and linearly moveable between extended and retracted positions, said shaft operatively coupled to said electrodes to move said electrodes between said first and second positions as said shaft moves between said extended and retracted positions.

3. An apparatus as set forth in claim 2 including a linkage mechanism operatively interconnecting said electrodes and said spindle and said shaft and supporting said electrodes relative to said spindle and said shaft between said first and second positions.

4. An apparatus as set forth in claim 1 wherein said electrodes are operatively connected to a source of dielectric fluid and each of said electrodes includes passages for presenting the dielectric fluid between said electrodes and the surface of the cylinder bore when said electrodes are in said second position.

5. An apparatus as set forth in claim 4 including a fluid coupling in fluid communication with the source of dielectric fluid and said passages of said electrodes.

6. An apparatus as set forth in claim 5 wherein said fluid coupling includes a fixed member having an inlet passage in fluid communication with the source of dielectric fluid and a moveable member rotatably carried on said spindle and having at least one outlet passage in fluid communication with said inlet passage of said fixed member and said passages of said electrodes.

7. An apparatus as set forth in claim 6 wherein said fluid coupling includes a fluid line extending between, rotating and in fluid communication with said at least one outlet passage and said passages of said electrodes.

8. An apparatus as set forth in claim 7 wherein said inlet passage terminates in an annular groove which extend about a circumference of said rotating moveable member and wherein said at least one outlet passage is in fluid communication with said annular grove and wherein said moveable member is annularly disposed about a middle portion of said spindle.

9. An apparatus as set forth in claim 1 wherein said electrical coupling includes a conductive line extending between, rotating and in electrical contact with said moveable connection member and each of said electrodes.

10. An apparatus for preparing a surface of a cylinder bore by electrical discharge machining comprising;

a rotatable spindle;

at least one electrode operatively connected to a power source and rotatably supported upon said spindle, said at least one electrode being moveable radially relative to the surface of the cylinder bore between a first retracted position such that said at least one electrode is positioned within the cylinder bore prior to preparing the surface and a second position spaced from said first position wherein said at least one electrode is adjacent the surface of the cylinder bore for preparing the surface by electrical discharge machining as said at least one electrode rotates with said spindle;

a centrally disposed shaft rotatably carried by said spindle and linearly moveable between extended and retracted positions, said shaft operatively coupled to said at least one electrode to move said at least one electrode between said first and second positions as said shaft moves between said extended and retracted positions;

a linkage mechanism operatively interconnecting said at least one electrode and said spindle and said shaft and supporting said at least one electrode relative to said spindle and said shaft between said first and second positions; and wherein said linkage mechanism has first and second ends, said first end being pivotally connected to said spindle, said second end being pivotally connected to said shaft, said linkage mechanism further including a center portion disposed between said first and second ends and pivotally coupled to said at least one electrode, said first and second ends and said center portion of said linkage mechanism co-acting such that said linkage mechanism moves said at least one electrode between said first and second positions when said shaft is moved between said extended and retracted positions.

11. An apparatus as set forth in claim 10 including an end cap fixed to a distal end of said shaft and interconnecting said second end of said linkage mechanism and said shaft and wherein said linkage mechanism includes a pair of link members pivotally coupled together and to said at least one electrode at said center portion wherein one of said pair of link members is pivotally connected to said spindle at said first end and the other of said pair of link members is pivotally connected to said end cap at said second end.

12. An apparatus for preparing a surface of a cylinder bore by electrical discharge machining comprising;

a rotatable spindle;

at least one electrode operatively connected to a power source and rotatably supported upon said spindle, said at least one electrode being moveable radially relative to the surface of the cylinder bore between a first retracted position such that said at least one electrode is positioned within the cylinder bore prior to preparing the surface and a second position spaced from said first position wherein said at least one electrode is adjacent the surface of the cylinder bore for preparing the surface by electrical discharge machining as said at least one electrode rotates with said spindle;

an electrical coupling operatively interconnected between the power source and said at least one electrode;

said electrical coupling including a fixed connection member electrically connected to the power source and a moveable member rotatably carried on said spindle and in electrical contact with said fixed connection member and said at least one electrode;

said electrical coupling including a conductive line extending between, rotating and in electrical contact with said moveable member and said at least one electrode; and wherein said spindle includes a hub, a bridge portion and a middle portion extending between said hub and said bridge portion, said electrical coupling including isolation blocks disposed between said movable member and said middle portion of said spindle to electrically isolate said electrical coupling from said middle portion of said spindle, said fixed connection member including a cavity and a spring member disposed therein, and an electrical conductor disposed between said spring member and said movable member and which is urged into electrical contact with said moveable member.

* * * * *